Patented Dec. 14, 1948

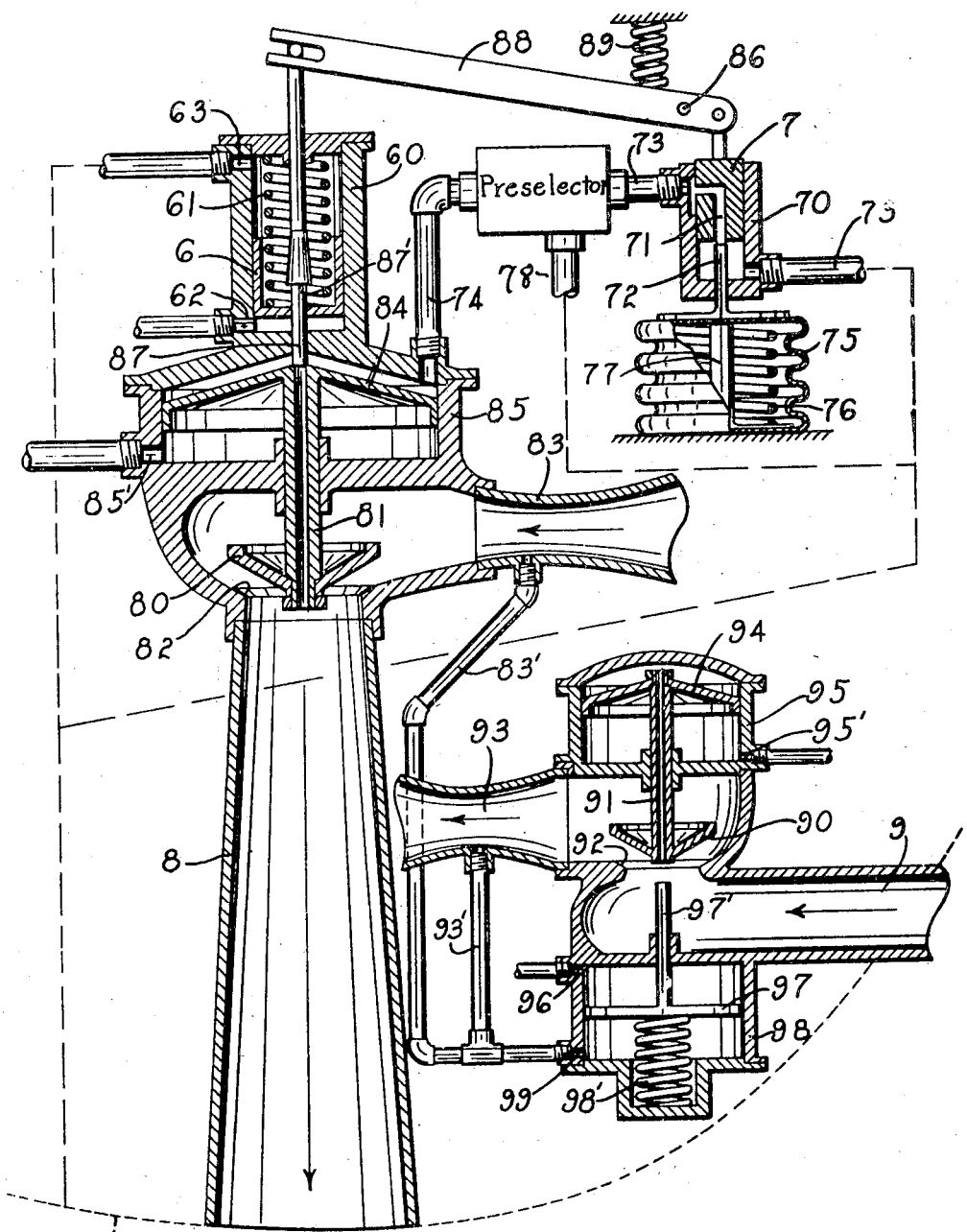

2,456,215

UNITED STATES PATENT OFFICE 2,456,215

PRESSURE-REGULATING CONTROL MECHANISM

Nathan C. Price, Hollywood, Calif., assignor to Boeing Airplane Company, a corporation of Delaware Original application June 27, 1938, Serial No. 216,028. Divided and this application October 6, 1943, Serial No. 505,201

23 Claims. (Cl. 98—1.5)

The present invention relates to the same general subject-matter as that of my Patent Re. 22,272, dated Feb. 16, 1943, and in effect constitutes an addition to or an improvement upon the subject matter of that patent in that herein are disclosed additional or auxiliary controls operable to govern the cabin pressure, yet operating at all times within the upper limits fixed by the basic differential-pressure control of the previous patent, and within the lower limits established by the normal atmospheric pressure curve. This application is a division of my application Serial No. 216,028, filed June 27, 1938, for Rate-of-pressure-change control for pressure cabins.

According to the previous invention the pressure within the cabin is controlled in such manner that between sea level or zero elevation and 8,000 feet elevation the pressure within the cabin follows the pressure curve of the outside atmosphere; there is no substantial differential. Between 8,000 feet and, let us say, 15,000 feet the pressure curve within the cabin is substantially level, that is, the pressure at 8,000 feet is maintained with little or no change, though the outside pressure above 8,000 feet is less than the pressure maintained within the cabin. A pressure differential increasing with increase of altitude is thus attained. Then from 15,000 feet up to perhaps 20,000 feet the pressure within the cabin is caused to drop at a rate substantially equal to the rate of atmospheric pressure drop, such as to maintain always a uniform differential of pressure between the inside of the cabin and the outside atmospheric pressure, the differential amounting, for instance, to 2½ pounds per square inch. The pressure within the cabin follows this single line, whether the airplane is ascending or descending, and if the plane was to descend from 20,000 feet to sea level, the pressure within the cabin would be maintained at the 2½ pound differential, no more and no less, down to the 15,000 foot altitude, then would remain substantially constant until the plane reached the 8,000 foot level, and then would closely follow the atmospheric curve from the 8,000 foot level down to sea level, or to any intermediate point.

The present device is in the nature of a refinement of the system disclosed in my aforementioned patent, and relates more particularly to the control device operable to regulate outflow from the cabin. In the present arrangement the absolute pressure sensitive device and the overriding differential pressure sensitive device are cooperative in their action, and both act upon a single valve which is the normal outflow valve. The device with which the present invention is particularly concerned has no essential relation to inflow control, but makes it possible to effect unified and sensitive control, and the outflow valve tends to maintain cabin pressures automatically more nearly at desired pressures.

More specifically it is an object of this invention to minimize fluctuations in pressure from the desired values, particularly in the range intermediate the unsupercharge range and the constant differential range, such as between 8,000 and 15,000 feet altitude.

It is a further object to simplify and improve the control mechanism which is the basis of my patent mentioned above, so that better regulation can be obtained with devices which are more sensitive and more compact than those disclosed in such patent.

In accomplishing such objects my improved type of mechanism will tend to decrease "hunting" of the outflow valve, which would cause fluctuations in the pressure alternately above and below the theoretical values.

Other objects will appear hereafter, and especially such as relate to the more purely mechanical details of my improved construction.

My invention is shown in the accompanying drawings largely in diagrammatic fashion, and the drawings and the constructions and arrangements shown therein are to be understood in the latter sense, but insofar as the principles thereof are concerned, the accompanying drawings show my invention arranged and functioning in a manner such as is at present preferred by me. The figure is a sectional view illustrating the relationship of the parts of the control mechanism to each other and particularly the interconnection between the absolute pressure control and the valve moving mechanism.

The pressure control device illustrated is in general similar to that disclosed in my above mentioned patent, though the arrangement of the parts is somewhat modified, except for the preselector device, which is described in detail in my parent application Serial No. 216,028.

The skin or enclosing wall of the pressure cabin is illustrated at 100. It is supported and strengthened by suitable structure, not shown, and the passenger space within it is sealed against leakage, as is common in pressure cabins. Pressure within this skin is controlled by the control device. Pressure without this skin varies in accordance with external pressure, sometimes called ambient pressure, and approximately inversely in accordance with altitude. Air is admitted to the interior of the cabin from any suitable pressure-producing blower or supercharging device (not shown) through a conduit 9, past a valve 90 having a hollow stem 91, and through a Venturi throat 93. The conduit, and associated parts, constitutes a means to supply air under pressure within the cabin. The valve may seat at 92 to prevent further intake of air into the cabin or to prevent escape of pressure from the interior of the cabin. It is movable, under the influence of a rate of flow control, by an air motor or servo device including a piston 94 movable within a cylinder 95, the space above the piston being capable of communication with supercharger pressure in the inlet conduit 9 through the hollow stem 91, and the space below the piston being in communication with the pressure within the interior of the cabin through the port 95'.

Control of the piston 94, however, is under the influence of a control device consisting of a piston 97 within a cylinder 98, the piston 97 being spring urged by a spring 98' to advance the pin 97' of the hollow stem 91 of the valve, thereby tending to close off the hollow stem from communication with the supercharger pressure. Movement of the piston 97 is under the influence of cabin pressure communicating with its upper side through a port 96, and a pressure effect communicating with its lower side through the port 99, the latter pressure effect being made up of a reduced pressure through a tube 93' from the inlet Venturi throat 93 or a reduced pressure through a tube 83' from the outlet Venturi throat 83, both communicating with the port 99, or made up as a combination or differential of such reduced pressure from the two Venturi throats. A valve (not shown) may be employed at the junction of the tubes 83' and 93' to control the reduced pressure at the port 99 under the influence of one or the other of the Venturi throats, but not both, such a valve being illustrated in my above-mentioned patent. Its use, however, is not deemed essential in the present arrangement.

Air from the interior of the cabin is discharged through an outlet 8 past a valve 80, capable of seating at 82 to prevent discharge from the interior or to prevent inlet of a higher pressure from the exterior of the cabin, the valve 80 having a hollow stem 81, and the air from the cabin passing through the venturi 83 prior to passing the valve seat 82 and being discharged through the discharge outlet 8. It will be seen that the interior of the hollow stem 81 is in communication at all times with the outlet 8, constituting a region of air pressure relatively low as compared to cabin pressure, and which air pressure is variable with and substantially equal to external atmospheric pressure.

Movement of the valve 80 may be accomplished under the influence of an air motor or servo device, including a movable servo element, such as piston 84, received within a cylinder 85 and dividing it into upper and lower chambers, such movable element being connected directly to the hollow stem 81. The chamber in such cylinder above the piston 84 is in communication with a region at an air pressure relatively low as compared to cabin pressure, preferably at substantially external atmospheric pressure, either through the hollow stem 81 or through a passage 73, 74, hereafter referred to. The chamber in such cylinder below the piston 84 is in direct communication with the cabin interior through the port 85'. Since piston 84 fits loosely in cylinder 85 air leaks slowly from the high pressure side past the piston to its low pressure side, whence it is exhausted through conduit 73, 74 to the atmosphere. Movement of the valve 80 and of the piston 84 is under control, directly or indirectly, of two alternatively operable control devices, a differential pressure control and an absolute pressure control, either of which may have an influence upon a pressure control valve pin 87 aligned with and capable of moving with stem 81 while abutting it, and thereby closing its hollow bore and preventing flow of air through this hollow stem from the space above the piston 84 to the outlet 8 below valve 80. However, under certain conditions, access of external atmospheric pressure to the chamber above the piston 84 may still be had through the passage 73, 74. The conditions governing this will appear hereafter.

Considering first the absolute pressure control device, the pin 87 may be considered as connected to and movable with one element of such device which is a ported plunger 7, movable within a cylinder 70, the port 71 of which is adapted to be opened or closed by recession or approach of a pin 72, which pin element of the absolute pressure sensitive unit is moved automatically in response to changes in cabin pressure. The pin 87 need not be directly connected to the plunger 7, and preferably the connection is through mechanical advantage means shown as a lever 88 fulcrumed at 86 adjacent one end, and with a compression spring 89 acting thereon, tending to urge the pin 87 towards its seat at the end of the hollow bore of the stem 81, and therefore tending to lift the plunger 7 with its hollow bore 71 off the pin 72, which otherwise would close the bore 71. Opening of the bore 71 permits communication through the passage 73, 74 between the exterior atmosphere and the chamber above the piston 84 to reduce the pressure upon the upper face of such piston, thereby, by the differential in the pressures acting on the piston's lower and upper sides, to raise the piston 84. However, the preselector, described in detail in my parent application Serial No. 216,028, is interposed between these conduits 73 and 74, and communicates with the atmosphere through a conduit 78 by-passing the absolute pressure control. Inclusion of such a preselector is optional as far as the present invention is concerned, serving as a purely auxiliary control.

Pin 72 is an element movable in response to changes in cabin pressure, being shifted by the evacuated Sylphon or bellows 75 on which it is mounted, such bellows being placed where it is exteriorly affected by the cabin pressure, and is therefore expanded or contracted automatically by decreases or increases, respectively, in cabin pressure. A limber spring 76 urges the stem 72 towards the bore 71, and collapse of the bellows 75 beyond a given point is prevented by a stop pin 77. Block 7 then constitutes a movable element cooperating with pin 72.

The function of the absolute pressure control device just described is to prevent appreciable further drop in pressure beyond a given point, and to maintain the pressure within the cabin substantially constant during the reduction in pressure in the surrounding atmosphere accompanying climbing of the aircraft to a higher altitude. In other words, it functions to maintain a substantially constant cabin pressure between 8,000 feet and 15,000 feet. However, the absolute pressure control is overruled by the differential pressure control when a predetermined differential of pressure between the interior cabin pressure and the external pressure has been attained, in order that the structure of the aircraft may not be strained by a pressure differential greater than that for which it is designed.

The differential pressure control will now be described. A piston 6 is movable within a cylinder 60 in alignment with and surrounding the pin 87. The piston 6 may engage a shoulder 87' on the pin 87 to lift the pin 87 from the end of the hollow stem 81, and the movement of the piston 6 in this direction is resisted at first by the limber compression spring 61, and, after engagement with shoulder 87', also by spring 89 acting on lever 88. The space beneath the piston 6 is in communication with the cabin pressure through the port 62, and the space above it is in communication with the atmosphere through the conduit 63.

It is not possible to maintain the pressure within the cabin at sea level pressure or at any selected constant pressure level for all necessary or feasible flight altitudes, nor indeed is it economical to maintain a pressure within the cabin which exceeds the external pressure by more than a predetermined difference, say 2½ pounds per square inch. Since it is unnecessary for various reasons to effect supercharging of the cabin at altitudes below 8,000 feet, or some altitude in that vicinity, the actual pressure within the cabin for any given altitude may be substantially equal to the external pressure at such altitude for all altitudes between sea level and 8,000 feet. However, if flight is to be maintained at an altitude between 8,000 feet and, let us say, 15,000 feet, it is desirable and possible to maintain the pressure between these limits of altitude substantially constant, the differential between it and the external pressure varying. To build up such differential between cabin and external pressure it is necessary to accomplish closing movement of valve 80 during operation of the absolute-pressure control for constant flow of air through the cabin, and ultimately to place in command the differential-pressure control, after which the opening of the valve remains substantially unchanged for constant flow through the cabin despite further increase in altitude and decrease in atmospheric pressure.

At altitudes above the 15,000 foot altitude which has been selected, it is not practical nor economical to maintain a constant pressure, and it is not harmful to permit the pressure to drop somewhat, and therefore the differential pressure control serves to maintain the acquired differential of cabin pressure over external pressure up to 20,000 feet elevation. At this point it may be assumed that the characteristics of the particular blower or supercharger being employed to supply air through the passage 9 are such that its limit has been reached, and it can no longer maintain the predetermined differential. If the aircraft proceeds to a higher elevation, the internal pressure will tend increasingly to approach the external pressure.

The position of parts for supercharged operation which is automatically initiated upon the attainment of a critical altitude, selected as 8,000 feet, is shown in the drawing. At such altitude, where it is desirable for supercharging to commence, the cabin pressure, acting upon the evacuated Sylphon bellows 75, becomes inadequate to equilibrate the combined expansive forces exerted by the spring 76 and by the resiliency of the bellows itself. Upon expansion of this absolute-pressure sensitive device in an upward direction in the drawing, metering pin 72 carried by it is moved to restrict the flow of air through the orifice 71 in the slidable plug 7, which is interposed between the inlet and outlet portions of tube 73. This restricts the flow of air from the upper side of piston 84 through the orifice 71, and thus tends to equalize the pressure across the piston 84.

The outrush of air past the valve 80 at all times tends to draw this valve downward to its seat, and to draw the connected piston 84 downward. Up to now (below 8,000 feet) the Sylphon 75 has been collapsed, and the space above the piston 84 has been in communication with reduced atmospheric pressures through 73, 71, and 74, thereby tending to balance the outflow's downward tendency, and, with the resistance of cabin pressure, acting beneath the piston 84, to downward movement, the piston and valve 80 are held in their upper position, with the valve open. Now, however, the expansion of the Sylphon 75 has reduced the pressure differential acting to hold the valve up, as described. The action of outflowing air on the valve now tends to close it, since the balancing force through 73, 71, 74 is interrupted and in part destroyed. Nor can this balancing force be restored at this time through the hollow stem 81, for the pin 87 follows downward movement of the piston 84, under the influence of spring 89, and prevents access of reduced external pressure to the space above the piston through the alternative passage formed by the hollow stem 81.

Closing movement of the valve, unless accompanied by precisely corresponding reduction of pressure of the inflowing air to the cabin, which does not ordinarily occur, increases the cabin pressure. This in turn causes recompression of the bellows 75 and reopening of the orifice 71 to the passage of air from the upper side of the piston 84, which results in the reopening of the valve 80 and a consequent reduction of cabin pressure. It is clear that this action would result in a repetitious cycle of instability wherein the valve would hunt and the cabin absolute pressure would oscillate between values slightly above and slightly below the preselected critical value at which the bellows 75 is expanded sufficiently to begin to close orifice 71.

This undesirable effect can be overcome by coordinating the movements of the outflow valve 80 and absolute pressure unit valve 72 by mechanism operatively interposed between them, including the linkage connecting plunger 87, abutting the hollow stem 81 of valve 80, to the orifice block 7, including rocker arm 88, the fulcrum of which is at 86, and the pivots at its opposite ends. The ratio of the parts into which the rocker arm is divided by this fulcrum is such that the plunger or pin 87 can follow the valve downward accompanied by relatively slight upward movement of block 7. As the difference in cabin pressure over external pressure increases, the valve must close increasingly, accompanied by corresponding movement of the pin 87, as stated. If bellows 75 maintained its control action without any further expansion whatever the cabin pressure would remain precisely constant over the increase in altitude of the airplane from 8,000 to 15,000 feet, during which range the absolute pressure device is in control. Upward movement of orifice block 7 as pin 87 follows the valve downward, however, requires bellows 75 to expand in order to maintain restriction of the orifice 71 by pin 72, and such expansion can only be effected by a corresponding decrease in cabin pressure.

Assuming that the inflow to the cabin remains substantially constant, therefore, and that the cabin leakage is negligible, closing movement of valve 80 at all times bears a definite and uniform relationship to the increase in differential of cabin pressure over the surrounding atmospheric pressure. On the other hand, expansion of bellows 75 corresponds directly to decrease in cabin pressure. As long as pin 87 seals the aperture through stem 81, therefore, lever 88, which directly interconnects valve 80 and bellows orifice block 7, controls the relative expansion of the bellows and closing of the valve, and hence, for a given increase in altitude, coordinates the incremental drop in cabin pressure with the incremental increase in the difference of cabin pressure over atmospheric pressure, or degree of supercharge. Since the increase in such pressure differential is the difference between the atmospheric pressure drop and the drop in cabin pressure, the incremental drop in cabin pressure is also uniformly related to the decrease in atmospheric pressure, and the same is true for an increase in both pressures.

It is evident that change in the location of fulcrum 86 along lever 88 will vary the ratio of movement between valve 80 and orifice block 7. Consequently the position of such fulcrum may be selected or altered as necessary to achieve the desired relationship between the incremental decrease in cabin pressure and the incremental increase in the difference of cabin pressure over atmospheric pressure, for a given ascent of the aircraft, as long as the absolute pressure control governs. Obviously if fulcrum 86 is moved to the left the expansion of bellows 75 will be correspondingly greater and the closing movement of valve 80 correspondingly less, so that a greater drop in cabin pressure will occur. I prefer, however, that the fulcrum be located sufficiently far to the right to prevent a drastic decrease in cabin pressure within the selected intermediate altitude range mentioned, but the ratio of orifice block movement to valve movement should be at least sufficiently great to check hunting movement of the valve, as will be explained hereafter.

Since, for a selected length of lever 88, the closer fulcrum 86 is to the lever connection to block 7 the less will be the decrease in cabin pressure required for expansion of bellows 75 to restrict orifice 71, it will be recognized that the cabin pressure over the intermediate range would be precisely constant if orifice block 7 remained fixed. That might be accomplished by locating the fulcrum of lever 88 in its limiting position, coincident with its connection to block 7, or, indeed, entirely separate from the block, so that only pin 87 would move with it. Moreover an actual increase in cabin pressure as the aircraft ascends would result if pivot 86 were located on the opposite side of the connection of bar 88 to block 7. In such event, as pin 87 followed the valve downward, orifice block 7 would be moved downward through a relatively small distance, but sufficient to restrict orifice 71 so that valve 80 would tend to close still further. The increase in cabin pressure thus induced would effect sufficient collapse of bellows 75 to restore the degree of opening of orifice 71 to place the valve, lever and orifice block again in equilibrium, but at an increased cabin pressure. Such an arrangement, however, would cause excessive overtravel, and consequent hunting of the valve.

With the preferred arrangement shown in the drawings, as valve 80 closes in response to expansion of the bellows 75 the orifice block 7 is withdrawn slightly from the metering pin 72, thus tending to reopen the passage 71 and to check the downward travel of the valve 80. Conversely, as the valve opens to relieve superfluous air from the cabin the orifice block 7 descends upon the metering pin 33, and thereby restricts the flow of air through passage 71 from the upper side of the piston 84, and checks the upward travel of the valve 80. It can thus be seen that as the valve begins to move in either direction in response to change in cabin absolute pressure there is an immediate counter effect which opposes such motion and prevents overtravel of the valve. The result is that the position of orifice 71 and metering pin 72 relative to each other is so maintained as to meter the flow of air from the upper side of piston 84, and thereby cause valve 80 to seek a stable position. Closure of the valve therefore proceeds slowly and regularly, in accordance with change of external pressure, and at a rate (coupled with control of inflow, described hereafter) to maintain a substantially constant pressure within the cabin.

Since the stable position of the valve for a given altitude may vary considerably with changes in the ventilating rate, differential pressure, or in cabin leakage conditions, the linkage between pin 87 and orifice plunger 7 is so arranged that the travel of the valve is considerably greater than that of the orifice in the particular installation pictured, as shown, approximately twelve times. In this way the position of the orifice 71 and the critical cabin absolute pressure which the unit tends to maintain are neither appreciably altered by any responsive movement of the valve.

It is evident that the arrangement of pin 72 and orifice block 7 might be reversed, the pin to be carried by lever 88 and the orifice block by bellows 75, and a description of the one is intended to include the reverse. Progressive closure of the valve 80, accomplished and controlled as described above, tends to reduce the rate of flow through the venturi 83, and in turn through the control piston 97 effects corresponding opening movement of the valve 90, the controls operating in such a manner, and as explained in greater detail in my previously mentioned patent, as to maintain the cabin pressure substantially constant.

At 15,000 feet elevation the differential-pressure control is brought into operation, overruling the absolute-pressure control, and thereafter, for increase in altitude, maintaining the cabin pressure at a constant differential above the external atmospheric pressure. Thus at such elevation the pressure in the space above the piston 6 has decreased, due to decrease in the external atmospheric pressure, while the pressure in the space beneath the piston 6 has remained substantially constant, being in communication with the cabin pressure. The differential thus built up at this point overcomes the limber spring 61, which may be adjusted to regulate the point of initiation of differential pressure control, and the piston 6 rises, or tends to rise, and eventually the piston 6 engages the shoulder 87' and lifts or tends to lift the pin 87 from its closure of the hollow stem 81. The pressure differential between the bottom and top of the piston 6 in addition overcomes the resistance of the spring 89 as well as that of the spring 76.

The tendency of the pin 87 to rise from the hollow bore of stem 81 tends to decrease the pressure above the piston 84, whereas the pressure beneath it is substantially the same as it was immediately prior to lifting of the pin. The piston 84 therefore tends to rise and to lift the valve 80 farther from its seat 82, and thus to increase the rate of outflow of air from the interior of the cabin, thereby decreasing the pressure within the cabin, but controlling the rate of decrease so that the cabin pressure remains always at the predetermined differential above the external pressure. Change in the rate of outflow through the venturi 83 tends to affect the position of the valve 90 correspondingly, so that the rate of inflow of replacement air is controlled in accordance with the rate of outflow to maintain the predetermined pressure differential within the cabin, as is described more fully in my previously mentioned patent. This condition would hold indefinitely if the blower were of sufficient capacity to supply the required pressure.

Overtravel of the valve is prevented by the fact that, as contact between the pin 87 and the stem 81 is broken by the action of the differential pressure control, the valve assembly follows the pin upwardly, and tends to restrict the entry of air into the bore of the stem. It is thus evident that an immediate resistance to further motion accompanies any increase in the lift of the valve in response to action of the differential pressure control, and that there will be no tendency for the valve to hunt, or for cabin pressure to fluctuate. The absolute-pressure sensitive device 76 will extend toward its full upward travel as cabin pressure is lowered accompanying an increase in altitude, so that the passage of air through the orifice 71 is virtually eliminated by entrance into it of pin 72, having a close sliding fit therein. Such expansion of bellows 75 therefore cannot tend to lift block 7 and force lever 88 to move pin 87 to close the orifice in valve stem 81 or press valve 80 downward, because pin 72 cannot press against block 7.

In all the above it will be observed that the pressure within the cabin in no case decreases below the external atmospheric pressure, because obviously this is impossible even during a descent, as long as replacement air is being supplied to the cabin, unless means are provided for evacuating the interior of the cabin. On the other hand, none of these pressures exceeds the selected limit of 2½ pounds differential over and above the atmospheric pressure. Of course, all the figures used in the above illustrations are arbitrary, and if the structure is intended to withstand a higher differential of pressure, then the selected differential or pressure limit, whatever that limit may be, is not exceeded, because as that differential pressure limit is attached, the differential pressure control will overrule the absolute pressure control and insure that the predetermined differential is not exceeded. This is a safety measure and prevents the imposition of undue stresses upon the structure.

I claim as my invention:

1. Mechanism to regulate aircraft cabin pressure, comprising a valve openable for outflow of air from the cabin, spring means biasing said valve to close, servo means operatively connected to open the valve in opposition to said spring means, and control means sensitive to a differential pressure varying in response to variations in the difference of cabin pressure over ambient atmospheric pressure, operatively associated with said servo means and operable to remove the biasing action of said spring means on said valve and to effect actuation of said servo means to exert a valve opening force on said valve automatically in response to an increase in the differential of cabin pressure over ambient atmospheric pressure exceeding a selected value.

2. Mechanism to regulate aircraft cabin pressure, comprising a valve openable for outflow of air from the cabin, spring means biasing said valve to close increasingly to increase the differential of cabin pressure over ambient atmospheric pressure for substantially constant quantity flow of air past the valve, servo means operatively connected to open the valve in opposition to said spring means, and control means sensitive to a differential pressure varying in response to variations in the difference of cabin pressure over ambient atmospheric pressure, operatively associated with said servo means and operable to remove the biasing action of said spring means on said valve and to effect actuation of said servo means to arrest closing movement of said valve automatically in response to an increase in the differential of cabin pressure over ambient atmospheric pressure exceeding a selected value.

3. Mechanism to regulate aircraft cabin pressure, comprising a valve openable for outflow of air from the cabin, spring means biasing said valve to close, servo means operatively connected to open the valve in opposition to said spring means, differential pressure control means sensitive to the difference of cabin pressure over ambient atmospheric pressure, operatively associated with said servo means and operable to remove the biasing action of said spring means on said valve and to effect actuation of said servo means to exert a valve opening force on said valve automatically in response to an increase in the differential of cabin pressure over ambient atmospheric pressure exceeding a selected value, and absolute pressure control means sensitive to cabin pressure, operatively associated with said servo means and operable to actuate the same to close the valve increasingly with decrease in atmospheric pressure to increase the differential of cabin pressure over atmospheric pressure within the selected limiting value of the differential pressure of cabin pressure over exterior pressure.

4. Mechanism to control the pressure within an aircraft cabin whereinto air is supplied under pressure, comprising a valve openable for outflow of air therepast from the cabin, servo means operatively connected to move said valve, including a movable element, means subjecting one side of said element to cabin pressure, the other side of said element being exposed to a chamber, means connecting such chamber to the aircraft cabin and to a region at a pressure lower than cabin pressure, for flow of air through such chamber from the aircraft cabin to such region of lower pressure, and means automatically responsive to changes in cabin pressure and operable to control such flow through said connecting means to govern the pressure in such chamber, thereby to alter the pressure differential acting upon said movable element of said servo means, thus to vary the degree of opening of said valve.

5. In a cabin pressure control, a valve openable for flow of air through the cabin, servo means operatively connected to move said valve, an absolute pressure responsive means including an evacuated bellows subject externally to cabin pressure, a shiftable block member having an orifice therein, means defining a passage communicating between the orifice of said shiftable block member and said servo means, a valve member cooperating with the orifice in said block member and shiftable relative thereto to control the effective size of the orifice for regulating the flow through said passage means, and hence the pressure to which said servo means is subjected, one of said members being operatively connected to said bellows for movement therewith, and a lever connected to the other of said members relatively close to the lever fulcrum, and operatively engaged with said cabin air flow valve relatively far from the lever fulcrum for movement therewith, to effect relatively slight movement of such other member corresponding to relatively large movement of said cabin air flow valve.

6. In a cabin pressure control, an outflow valve biased to close, a stem, and a pressure movable servo member, all operatively connected, said servo member dividing a space into a high and a low pressure chamber, passage means directly interconnecting the high pressure chamber and the cabin to establish cabin pressure in such chamber tending to open the valve, and providing bleeding of substantially cabin pressure air into the low pressure chamber, two passages alternatively connecting the low pressure chamber with a source of pressure lower than cabin pressure, control valve means in each such passage, an absolute-pressure responsive means subject to cabin pressure, operatively connected to regulate one such control valve means, to maintain cabin pressure elevated above external pressure, and a differential pressure responsive means subject to cabin pressure and to external pressure, operatively connected to regulate the other such control valve means, to prevent cabin pressure exceeding external pressure by more than a selected value.

7. A cabin pressure control as in claim 6, wherein the absolute pressure responsive means and its associated control valve means comprises an evacuated bellows subject externally to cabin pressure, a needle valve element, and a cooperating orifice block element shiftable axially of and relative to the needle valve element to control the effective size of the orifice and the low pressure force effective upon the servo member, one of said elements being operatively connected to the bellows, and follow-up means operatively connecting the other of said elements to the outflow valve.

8. A cabin pressure control as in claim 6, wherein the differential pressure responsive means and its associated control valve means comprises a follower stem arranged for follow-up movement with and with relation to the outflow valve's stem, one of such stems being hollow and constituting a part of the corresponding low pressure passage, and the end of the other stem constituting a valve for the hollow stem, a spring loaded piston subject, on one side to cabin pressure and on its other side to external pressure, and stop means interengageable between the piston and the follower stem, following predetermined movement of the piston due to increasing differential of pressure, to shift the follower stem away from the outflow valve stem, and thereby to open the passage through the hollow stem to increase the low pressure force effective upon the servo member.

9. A cabin pressure control as in claim 6, wherein the absolute pressure control and its associated control valve means comprises a shiftable orifice block, arranged in the corresponding passage, and a cooperating registering and shiftable metering pin arranged to close the passage through the orifice block to a greater or lesser degree, an evacuated bellows subject externally to cabin pressure, and operatively connected to shift the metering pin, and means reacting from the outflow valve to effect follow-up shifting of the orifice block.

10. A cabin pressure control as in claim 6, wherein the differential pressure control and its associated control valve means comprises a cylinder and a piston therein arranged coaxially with the outflow valve stem, the piston being subject to cabin pressure at one side and to external atmospheric pressure at its opposite side, a spring resisting movement of the piston, and yieldable under a selected pressure difference, a follower stem penetrating the piston and its cylinder, and engageable by the valve's stem, one such stem being hollow and also communicating with the external atmosphere, the other stem cooperating therewith to nearly close off the adjacent end of the stem hollow, and a shoulder on said follower stem engageable by the piston when the spring yields under the selected pressure difference, to unseat the follower stem from the valve stem.

11. A cabin pressure control as in claim 6, wherein the differential pressure control and its associated control valve means comprises a cylinder and a piston therein arranged coaxially with the outflow valve stem, the piston being subject to cabin pressure at one side and to external atmospheric pressure at its opposite side, a spring resisting movement of the piston, and yieldable under a selected pressure difference, a follower stem penetrating the piston and its cylinder, and engageable by the valve's stem, one such stem being hollow and also communicating with the external atmosphere, the other stem cooperating therewith to nearly close off the adjacent end of the stem hollow, a shoulder on said follower stem engageable by the piston when the spring yields under the selected pressure difference, to unseat the follower stem from the valve stem, and an interconnection between the follower stem and the absolute pressure control, to shift the follower stem in correspondence with movement of the servo member under the influence of the absolute pressure control, and thereby to retain the stem hollow nearly closed until opened by the differential pressure control.

12. Mechanism to control aircraft cabin pressure, comprising a valve openable for outflow of air from the cabin, a stem for said valve, a pressure movable servo member secured on the stem, a casing enclosing the servo member and divided thereby into two chambers, passage means directly interconnecting one of said chambers and the cabin to establish cabin pressure in such chamber tending to open the valve, and providing bleeding of substantially cabin pressure air into the other of said chambers, two alternate passages leading from such other chamber to a low pressure source, and when in communication therewith assisting to open the valve, and two alternative pressure sensitive devices, one associated with each such passage, to control communication through the latter, one of said pressure sensitive devices being responsive to the difference of cabin pressure over external pressure, and arranged to open its passage at a selected differential, to prevent the same being exceeded, and the other pressure sensitive device being subject to absolute pressure, and arranged to effect increase of cabin pressure over external pressure.

13. Mechanism to control aircraft cabin pressure, comprising a valve openable for outflow of air from the cabin, an integral valve stem, a pressure movable diaphragm secured on the stem, a casing enclosing the diaphragm and divided thereby into two chambers, passage means directly interconnecting one of said chambers and the cabin to establish cabin pressure in such chamber tending to open the valve, and providing bleeding of substantially cabin pressure air into the other of said chambers, two alternate passages leading from such other chamber to a low pressure source, and when in communication therewith assisting to open the valve, and two alternative pressure sensitive devices, one associated with each such passage, to control communication through the latter, one of said pressure sensitive devices being responsive to cabin pressure, and arranged to modify flow through its passage with decrease of cabin pressure, to create an elevated cabin pressure, and the other pressure sensitive device being subject to the difference of cabin pressure over external pressure, and arranged to limit such differential pressure.

14. In a cabin pressure control, an outflow valve biased to close, an integral stem, a pressure movable servo member fixed to said stem, a casing divided by said servo member into a high pressure and a low pressure chamber, the high pressure chamber having communication with the cabin's pressure, tending to open the valve, two passages alternatively connecting the low pressure chamber with a source of lower pressure, which is a function of external atmospheric pressure, a piston movable within a cylinder, a follower stem penetrating said piston, and disposed coaxially with the outflow valve stem and shiftable therewith, one of said stems being hollow and constituting a part of one such passage, and affording communication between the low pressure chamber and a low pressure region, but normally nearly seated upon the other stem to materially restrict such communication, a spring of given force urging the piston downwardly, its lower side having communication with the cabin pressure, whereby upon attainment of a selected difference of cabin pressure over external pressure the spring is yieldable to permit the piston to rise, a shoulder on the follower stem engageable by the rising piston, to unseat the hollow stem, an orifice block and cooperating metering pin arranged in the alternative passage from the low pressure chamber, an evacuated bellows subject externally to cabin pressure, operatively connected to shift the metering pin to create an elevated cabin pressure, and a follow-up connection between the orifice block and the follower stem, to shift the latter in accordance with movement of the outflow valve under the influence of said bellows.

15. Mechanism to regulate aircraft cabin pressure, comprising an outflow valve openable for outflow of air from the cabin, pneumatic servo means operatively connected to the valve to effect movement thereof, passage means defining an air passage communicating with said servo means for varying the pressure therein, a stem cooperating with said valve to define a regulating valve in the passage formed by said passage means, actuating means normally operable to move said stem conjointly with said outflow valve to maintain such passage means regulating valve normally closed, and control means sensitive to a differential pressure varying in response to variations in the difference of cabin pressure over ambient atmospheric pressure, engageable with said stem to arrest movement thereof by said stem actuating means as said outflow valve closes, for movement of said outflow valve away from said stem to open such passage means regulating valve for flow of air through said passage means to vary the air pressure in said servo means for arresting closing movement of said outflow valve thereby.

16. In a cabin pressure control, a valve openable for outflow of air from the cabin, a high pressure source, a low pressure source, a servo element having one side communicating with the high pressure source and the other side communicating with the low pressure source, and movable by a differential in the pressures produced by such pressure sources on opposite sides thereof, means operatively connecting said servo element to said valve to move it toward open position, an absolute pressure responsive means subject to cabin pressure, operatively connected to one of said pressure sources to regulate the value of the differential in the pressures acting on said elements, thereby to effect progressive closing of said valve as the ambient atmospheric pressure decreases to maintain cabin pressure elevated above atmospheric pressure, and movement coordinating means operatively interposed between said valve and said absolute pressure responsive means and operable to coordinate closing movement of said outflow valve with decreasing cabin pressure movement of said absolute pressure responsive means, and vice versa, said movement coordinating means including a member moved automatically in response to closing movement of said valve and to a corresponding degree, and operatively connected to said absolute pressure responsive means to effect relatively slight cabin pressure decreasing movement thereof corresponding to relatively large closing movement of said valve.

17. A cabin pressure control as defined in claim 16, in which the automatically moved member of the movement coordinating means is a lever having an eccentrically located fulcrum, the long end of said lever being movable automatically in response to movement of the valve and to the same degree, the short end of said lever being operatively connected to the absolute pressure responsive means to move the same.

18. In an aircraft having a pressure cabin and means for delivering air thereto at greater than atmospheric pressure, a cabin pressure control system comprising a valve in the cabin wall for bleeding air therefrom, a control device including an element movable in response to changes in cabin pressure and a cooperating movable element, relative movement of said elements governing said valve to close progressively as the surrounding atmospheric pressure decreases with increasing altitude, to maintain pressure within said cabin at values above the corresponding atmospheric pressures, follow-up means moved by said valve, and mechanical advantage means operatively connecting said follow-up means and said cooperating movable element of said control device, and operable by said follow-up means to move said cooperating movable element to a lesser degree but in definite ratio to the movement of said valve, said cooperating movable element, by such movement, governing said control device to actuate said valve for decreasing cabin pressure progressively with increasing altitude by increments less than the corresponding increments of decrease in surrounding atmospheric pressure.

19. Mechanism to regulate aircraft cabin pressure, comprising a valve openable for outflow of air from the cabin, pneumatic servo means including an air chamber, high pressure source means affording communication between said air chamber and the aircraft cabin, low pressure source means affording communication between said air chamber and a region at an air pressure relatively low as compared to cabin pressure, and a pressure responsive element disposed in such chamber between the openings of said high pressure source means and said low pressure source means into such chamber and operated by the air pressure chamber differential produced thereby, and operatively connected to the valve to move therewith and to effect movement thereof, valve mechanism operable to vary the communication through said low pressure source means between said air chamber and such region of relatively low air pressure, including a control member normally abutting said valve-connected element and in such relationship severing communication through said low pressure source means between said air chamber and such region of relatively low air pressure, and movable relative to said valve-connected element from such abutting relationship to decrease the pressure within such air chamber, and differential pressure control means sensitive to a differential pressure varying in response to the difference of cabin pressure over ambient atmospheric pressure, and operable to move said control member relative to said valve-connected element from abutting relationship for establishing communication through said low pressure source means between said air chamber and such region of relatively low air pressure for decreasing the pressure therein to exert a valve opening force on said valve-connected element.

20. Mechanism to regulate aircraft cabin pressure, comprising a valve openable for outflow of air from the cabin, pneumatic servo means including an air chamber, high pressure source means affording communication between said air chamber and the aircraft cabin, low pressure source means affording communication between said air chamber and a region at an air pressure relatively low as compared to cabin pressure, and an element disposed in such chamber between the openings of said high pressure source means and said low pressure source means into such chamber and operated by the air pressure chamber differential produced thereby, and operatively connected to the valve to move therewith and to effect movement thereof, valve mechanism operable to vary the communication through said low pressure source means between said air chamber and such region of relatively low air pressure, including a control member normally abutting said valve-connected element and in such relationship severing communication through said low pressure source means between said air chamber and such region of relatively low air pressure, and movable relative to said valve-connected element from such abutting relationship to decrease the pressure within such air chamber, and differential pressure control means sensitive to a differential pressure varying in response to the difference of cabin pressure over ambient atmospheric pressure, and operable to move said control member relative to said valve-connected element from abutting relationship for establishing communication through said low pressure source means between said air chamber and such region of relatively low air pressure for decreasing the pressure therein to exert a valve opening force on said valve-connected element, and absolute pressure control means sensitive to cabin pressure and operable to control communication between such air chamber and a region of an air pressure relatively low as compared to cabin pressure, and consequently to control the pressure acting on said valve-connected element while said valve mechanism control member is in position abutting said valve-connected element.

21. Mechanism to control the pressure within an aircraft cabin whereinto air is supplied under pressure, comprising a valve openable for outflow of air therepast from the cabin, servo means operatively connected to move said valve, including a movable element, means subjecting one side of said element directly to cabin pressure and providing bleeding of substantially cabin pressure air to the other side thereof, means establishing communication between such other side of said movable element and a region at a pressure lower than cabin pressure, and means responsive to changes in cabin pressure and automatically operable to control the communication effected by such communication establishing means with such lower pressure region to vary the pressure on such other side of said movable element, thereby to alter the pressure differential acting on said movable element of said servo means, and hence the degree of opening of said valve.

22. In a cabin pressure control, a valve openable for outflow of air from the cabin, actuating means for said valve, control means operable to regulate said actuating means including an absolute pressure responsive means subject to cabin pressure, and movement-coordinating means operatively interposed between said outflow valve and said absolute pressure responsive means and operable to coordinate closing movement of said outflow valve with decreasing cabin pressure movement of said absolute pressure responsive means, and vice versa, said movement-coordinating means including a member moved automatically in response to closing movement of said valve, and to a corresponding degree, and operatively connected to said absolute pressure responsive means to effect relatively slight cabin pressure decreasing movement thereof corresponding to relatively large closing movement of said valve.

23. In a cabin pressure control, a valve openable for outflow of air from the cabin, actuating means for said valve, control means operable to regulate said actuating means including absolute pressure responsive means subject to cabin pressure, an element operated by said actuating means and moved progressively in one direction as the surrounding atmospheric pressure decreases with increasing altitude, and movement-coordinating means directly connecting said element and said absolute pressure responsive means and operable to coordinate movement of said element in such direction with decreasing cabin pressure movement of said absolute pressure responsive means, and vice versa, in corresponding degrees, and operatively connected to said absolute pressure responsive means to effect relatively slight cabin pressure decreasing movement thereof by relatively large movement of said element in such direction.

NATHAN C. PRICE.

(References on following page)

REFERENCES CITED

The following references are of record in the file of this patent:

UNITED STATES PATENTS

| Number | Name | Date |
|---|---|---|
| Re. 22,272 | Price | Feb. 16, 1943 |
| 1,562,663 | Strong | Nov. 24, 1925 |
| 1,832,809 | Hudson | Nov. 17, 1931 |
| 1,890,472 | Temple | Dec. 13, 1932 |
| 2,002,057 | Gregg | May 21, 1935 |
| 2,125,949 | O'Conner | Aug. 9, 1938 |
| 2,307,199 | Cooper | Jan. 5, 1943 |
| 2,419,707 | Cooper et al. | Apr. 29, 1947 |

FOREIGN PATENTS

| Number | Country | Date |
|---|---|---|
| 514,055 | France | Nov. 8, 1920 |
| 521,623 | Great Britain | May 27, 1940 |

Certificate of Correction

Patent No. 2,456,215.         December 14, 1948.

NATHAN C. PRICE

It is hereby certified that errors appear in the printed specification of the above numbered patent requiring correction as follows:

Column 14, line 26, claim 16, after the word "said" insert *servo*; same line, for "elements" read *element*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*